United States Patent
Jiang et al.

(10) Patent No.: US 12,225,506 B2
(45) Date of Patent: Feb. 11, 2025

(54) SYSTEM AND METHOD FOR SUPPORTING OPERATING STATIONS ON AN EXTREME HIGH THROUGHPUT LINK

(71) Applicant: Apple Inc., Cupertino, CA (US)

(72) Inventors: Jinjing Jiang, San Jose, CA (US); Yong Liu, Campbell, CA (US); Tianyu Wu, Cupertino, CA (US); Qi Wang, Sunnyvale, CA (US); Su Khiong Yong, Palo Alto, CA (US); Jarkko L. Kneckt, Los Gatos, CA (US); Lochan Verma, San Diego, CA (US)

(73) Assignee: APPLE INC., Cupertino, CA (US)

( * ) Notice: Subject to any disclaimer, the term of this patent is extended or adjusted under 35 U.S.C. 154(b) by 252 days.

(21) Appl. No.: 17/491,155

(22) Filed: Sep. 30, 2021

(65) Prior Publication Data

US 2022/0132481 A1 Apr. 28, 2022

Related U.S. Application Data

(60) Provisional application No. 63/104,334, filed on Oct. 22, 2020.

(51) Int. Cl.
*H04W 72/044* (2023.01)
*H04W 74/0808* (2024.01)

(52) U.S. Cl.
CPC ..... *H04W 72/044* (2013.01); *H04W 74/0808* (2013.01)

(58) Field of Classification Search
None
See application file for complete search history.

(56) References Cited

U.S. PATENT DOCUMENTS

| | | | |
|---|---|---|---|
| 9,007,969 B1* | 4/2015 | Venkatesh | H04W 8/26 370/310 |
| 2019/0246354 A1* | 8/2019 | Huang | H04W 52/0229 |
| 2019/0313404 A1* | 10/2019 | Chu | H04W 72/21 |
| 2021/0218450 A1* | 7/2021 | Liu | H04B 1/7143 |
| 2021/0266890 A1* | 8/2021 | Chu | H04W 72/51 |
| 2022/0279365 A1* | 9/2022 | Du | G01S 13/24 |
| 2023/0066731 A1* | 3/2023 | Gan | H04W 72/23 |
| 2023/0231752 A1* | 7/2023 | Liu | H04W 72/04 375/262 |

* cited by examiner

*Primary Examiner* — Saumit Shah
(74) *Attorney, Agent, or Firm* — Sterne, Kessler, Goldstein & Fox P.L.L.C.

(57) ABSTRACT

Methods and apparatuses are disclosed for high-bandwidth stations in a WiFi environment. In embodiments, a bandwidth of communications supported by the access point is divided into multiple frequency segments. In an embodiment, bandwidths up to 320 MHz are supported, which can be subdivided into four frequency segments of 80 MHz each. Different stations park on different frequency segments, whereas the access point has its primary channel located on the first frequency segment. With this configuration, uplink and downlink channel access can be provided to the different stations using a primary channel hopping pattern, which is provided to the stations from the AP. This pattern provides time windows for each frequency segment, during which the stations in that segment are able to freely communicate. Several other aspects of the disclosure further support this configuration and other high-bandwidth configurations.

20 Claims, 11 Drawing Sheets

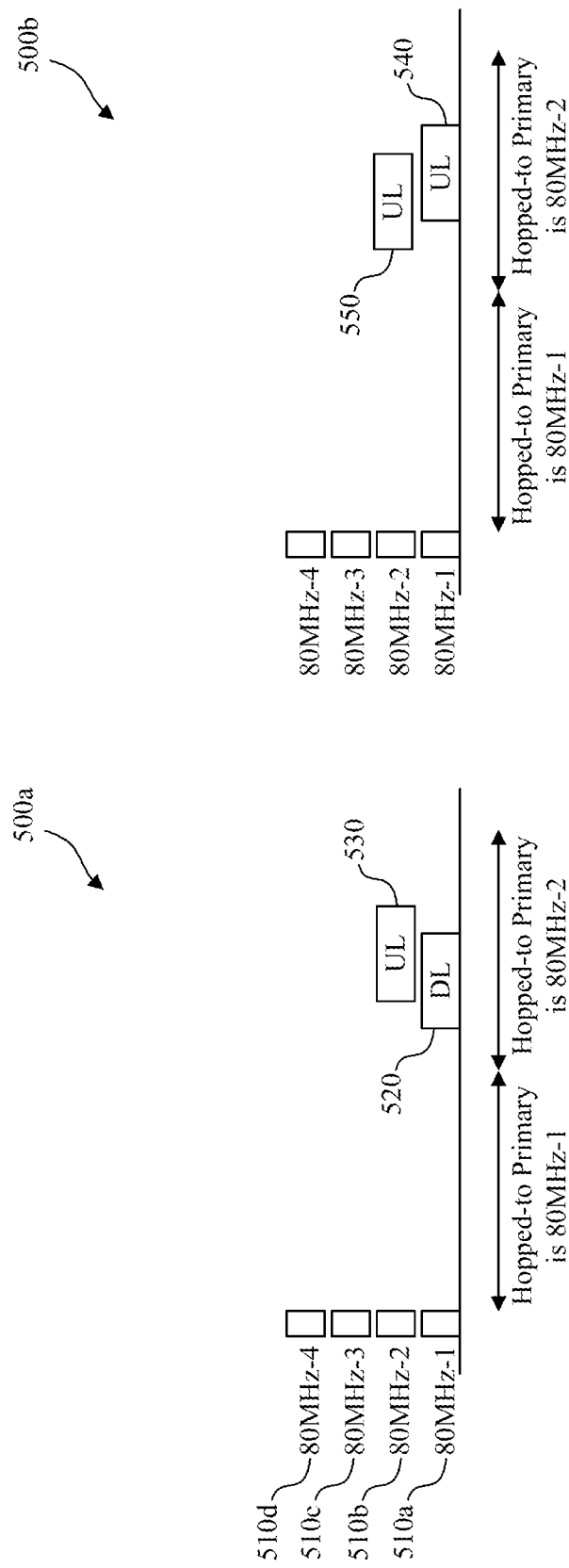

SYSTEM AND METHOD FOR SUPPORTING OPERATING STATIONS ON AN EXTREME HIGH THROUGHPUT LINK

CROSS-REFERENCE TO RELATED APPLICATIONS

The present application claims the benefit of U.S. Provisional Patent Application No. 63/104,334, filed Oct. 22, 2020, which is incorporated herein by reference in its entirety.

FIELD

Various aspects generally relate to the field of wireless communications.

SUMMARY

Some embodiments include an apparatus, method, and computer program product for implementing support for operating stations in a high throughput wireless communication environment. In embodiments, a bandwidth of communications supported by the access point is divided into multiple frequency segments. In an embodiment, bandwidths up to 320 MHz are supported, which can be subdivided into four frequency segments of 80 MHz each. Different stations park on different frequency segments, whereas the access point has its primary channel located on the first frequency segment. With this configuration, uplink and downlink channel access can be provided to the different stations using a primary channel hopping pattern, which is provided to the stations from the AP. This pattern provides time window(s) for each frequency segment, during which the stations in that segment are able to freely communicate. Several other aspects of the disclosure further support this configuration and other high-bandwidth configurations.

In an aspect of the disclosure, an access point is disclosed that includes a transceiver configured to transmit and receive wireless signals in communication with a plurality of stations distributed over a predefined bandwidth and one or more processors. The one or more processors are configured to define a plurality of frequency segments within the predefined bandwidth, and define a plurality of time windows within a beacon interval respectively corresponding to the plurality of frequency segments. The one or more processors are further configured to transmit, using the transceiver, a message to the plurality of stations, the message including notification of the plurality of time windows, and to adjust a reception frequency according to the plurality of time windows and their respectively corresponding frequency segments.

In an aspect of the disclosure, the frequency segments each have a same predefined bandwidth.

In an aspect of the disclosure, the predefined bandwidth is at least 160 MHz and a bandwidth of the frequency segments is 80 MHz.

In an aspect of the disclosure, the plurality of time windows includes a same number of time windows associated with each of the plurality of frequency segments.

In an aspect of the disclosure, the plurality of time windows includes four time windows, each having a duration of one fourth of the beacon interval.

In an aspect of the disclosure, the plurality of time windows includes eight time windows, each have a duration of one eight of the beacon interval.

In an aspect of the disclosure, the one or more processors causes a primary frequency to cycle from a first frequency segment to a last frequency segment through successive time windows of the plurality of time windows.

In an aspect of the disclosure, the one or more processors are further configured to delegate a subchannel within each frequency segment, the subchannel comprising a subset of the bandwidth of the frequency segment.

In an aspect of the disclosure, the one or more processors are further configured to transmit a beacon on each of the delegate subchannels.

In an aspect of the disclosure, an access point is disclosed that includes a transceiver configured to transmit and receive wireless signals in communication with a plurality of stations distributed over a predefined bandwidth, the predefined bandwidth including a plurality of frequency segments. One or more processors are configured to determine that a downlink transmission is needed, check that a primary channel of the access point is idle, check that a frequency segment of the plurality of frequency segments is idle, occupy the primary channel and the frequency segment, and transmit, using the transceiver, the downlink transmission in the primary channel and the frequency segment.

In an aspect of the disclosure, the frequency segment is a hopped-to frequency segment.

In an aspect of the disclosure, the hopped-to frequency segment is a frequency segment from among the plurality of frequency segments on which a primary channel resides.

In an aspect of the disclosure, the one or more processors are further configured to receive a downlink trigger from one of the plurality of stations, determine that a channel is busy only due to traffic from an overlapping base service set, and grant channel access to the one of the plurality of stations in response to the determining.

In an aspect of the disclosure, the one or more processors are further configured to change a primary channel of the access point to another one of the plurality of frequency segments, generate a notification message that includes the changed primary channel, and cause the transceiver to transmit the notification message to the plurality of stations.

In an aspect of the disclosure, a method is disclosed for supporting high-bandwidth stations in a wireless communication environment. The method includes defining a plurality of frequency segments within a predefined bandwidth, defining a plurality of time windows with a beacon interval respectively corresponding to the plurality of frequency segments, transmitting a message to the plurality of stations, the message including notification of the plurality of time windows. The method further includes adjusting a primary communication frequency according to the plurality of time windows, and receiving messages from the plurality of stations on the primary communication frequency.

In an aspect of the disclosure, the bandwidth is 320 MHz, and each frequency segment includes a bandwidth of 80 MHz.

In an aspect of the disclosure, each time window includes a same duration.

In an aspect of the disclosure, the method further includes receiving a channel access request from a legacy station, determining whether a primary channel of the legacy station and a hopped-to primary channel are idle, and authorizing the channel access based on the determining.

In an aspect of the disclosure, the method further includes generating a trigger frame associated with each of the plurality of frequency segments for transmission to the plurality of stations, a first portion of the trigger frames including common data and a second portion of the trigger frames including different data depending on the frequency segment for which the trigger frames are generated.

In an aspect of the disclosure, the first portion includes Trigger Frame Common Information, and wherein the second portion includes a Trigger Frame User Information List.

BRIEF DESCRIPTION OF THE FIGURES

FIG. 5A illustrates an exemplary frequency spectrum diagram according to some aspects of the disclosure;

FIG. 5B illustrates an exemplary frequency spectrum diagram according to some aspects of the disclosure;

DETAILED DESCRIPTION

With each successive generation of WiFi communication, increasing bandwidth is always a high priority. In the current wireless standard, 802.11be, the bandwidth of the Basic Service Set (BSS) is 320 MHz. However, despite this large bandwidth available at modern-day access points (Aps), stations (STAs) will exist well into the future that are 80 MHz-only operating STAs. Therefore, it is beneficial to disperse the 320 MHz operating space over different 80 MHz operating segments in the BSS.

The latest evolution in WiFi, referred to as IEEE 802.11ax (otherwise known as WiFi6) is being implemented. In this standard, trigger-enabled target wake time (TWT) and subchannel selective transmission (SST) are the two major mechanisms to support this operation of dividing the available bandwidth into useable segments. But 802.11ax only currently supports 20 MHz-only operating STAs. In particular, the 802.11ax BSS bandwidth is 80 MHz, and there are situations where STAs will desire operation on only 20 MHz. This can occur for multiple reasons, such as for purposes of power conservation. In this case, 802.11ax defines this SST and utilizes trigger enabled TWT to elect these 20 MHz operating states. In the discussion that follows, enhancements and optimizations are discussed for these operations.

Figure 1:
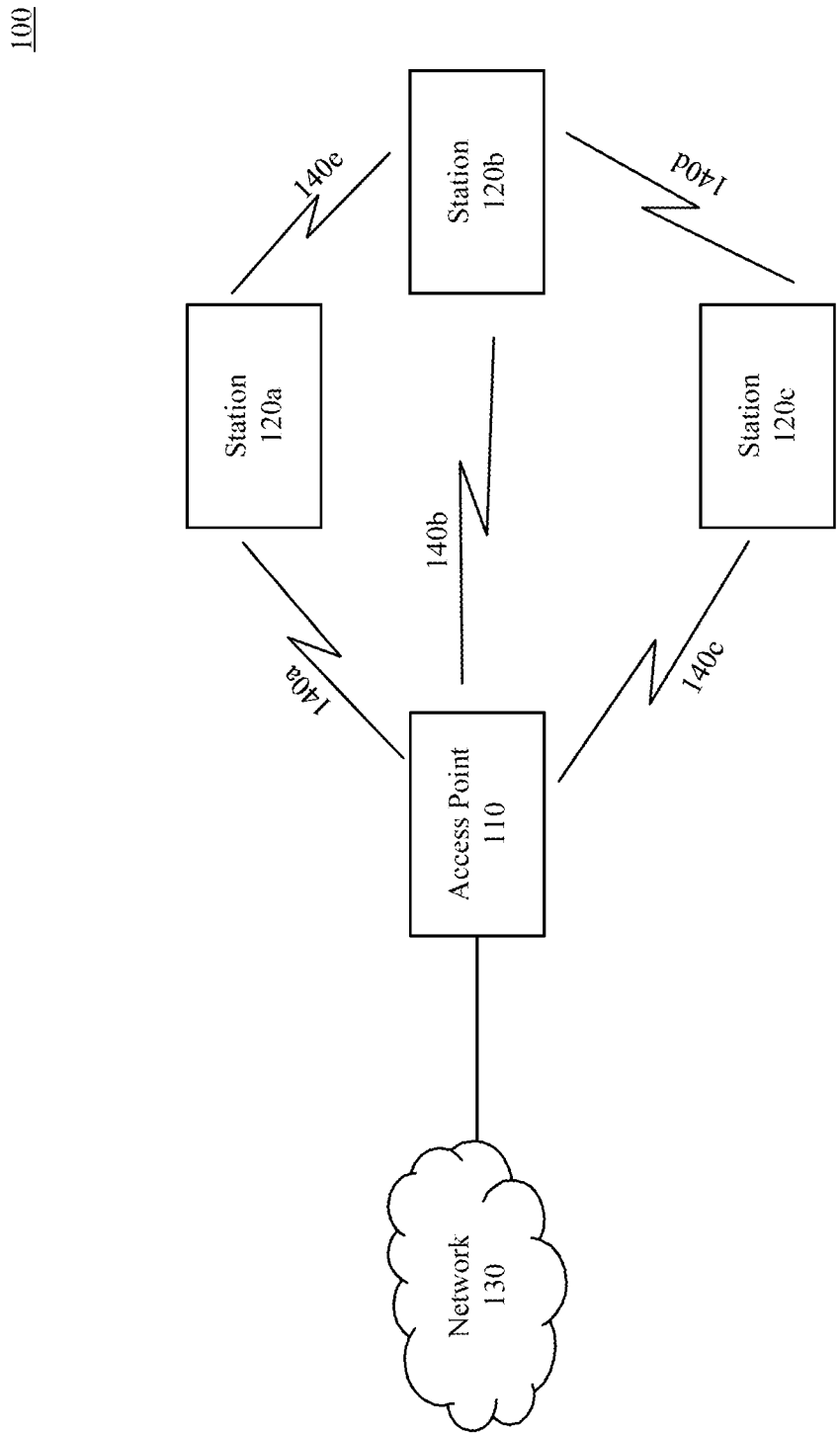
FIG. 1 illustrates an exemplary wireless communication environment according to some aspects of the disclosure.

FIG. 1 illustrates an example system 100 for supporting 80 MHz stations, according to some aspects of the disclosure. Example system 100 is provided for the purpose of illustration only and does not limit the disclosed aspects. System 100 may include, but is not limited to, access point (AP) 110, stations (STA) 120, and network 130. Stations 120a-120c may include, but are not limited to, Wireless Local Area Network (WLAN) stations such as wireless communication devices, smart phones, laptops, desktops, tablets, personal assistants, monitors, televisions, wearable devices (e.g., smart watches), and the like. Access point (AP) 110 may include but is not limited to WLAN electronic devices such as a wireless router, a wearable device (e.g., a smart watch), a wireless communication device (e.g., a smart phone), or a combination thereof Network 130 may be the Internet and/or a WLAN. Station 120's communications are shown as wireless communications 140. The communication between AP 110 and STA 120 can take place using wireless communications 140a-140c. The communication between STAs 120 can take place using wireless communications 140d-140e. The wireless communications 140a-140e can be based on a wide variety of wireless communication techniques. These techniques can include, but are not limited to, techniques based on IEEE 802.11 (such as, but not limited to, IEEE 802.11ac, IEEE 802.11ax, IEEE 802.11bc, IEEE 802.11bd, IEEE 802.11be, IEEE 802.11v, etc.)

It is noted that although some aspects are discussed with respect to some examples of WLAN, the aspects of this disclosure are not limited to these examples of WLAN and can be used by other WLAN topologies such as, but not limited to, infrastructure network, peer-to-peer network, mesh network, and the like. Also, some aspects of this disclosure are discussed with respect to the communication between non-AP STAs (for example, STAs 120) and/or the communication between an AP (for example, AP 110) and a non-AP STA (for example, STA 120). However, the aspects of this disclosure can be applied to the communications between any STAs (AP and/or non-AP STAs).

According to some aspects, AP 110 and/or STAs 120 are configured for supporting 80 MHz STAs. According to some aspects, when a frame with large bandwidth (BW) and/or in the large-size RU aggregation mode is used, the BW can be divided into a plurality of sub-channels (e.g. frequency segments). According to some examples, one or more of the sub-channels in the BW can be used for incumbent devices' transmissions. These one or more sub-channels can be used by other devices (for example, incumbent devices such as satellites, radars, etc. that used to use those channels/bandwidths) to transmit data/information that use the frequencies in those one or more sub-channels. In other words, these one or more sub-channels are considered puncture sub-channels. Some aspects of this disclosure discuss a single puncture sub-channel. However, the aspects of this disclosure are not limited to these examples, and other number of puncture sub-channels can be used. In a non-limiting example, an AP includes a 320 MHz BW. In this non-limiting example, the 320 MHz BW can include four 80 MHz sub-channels.

Figure 2:
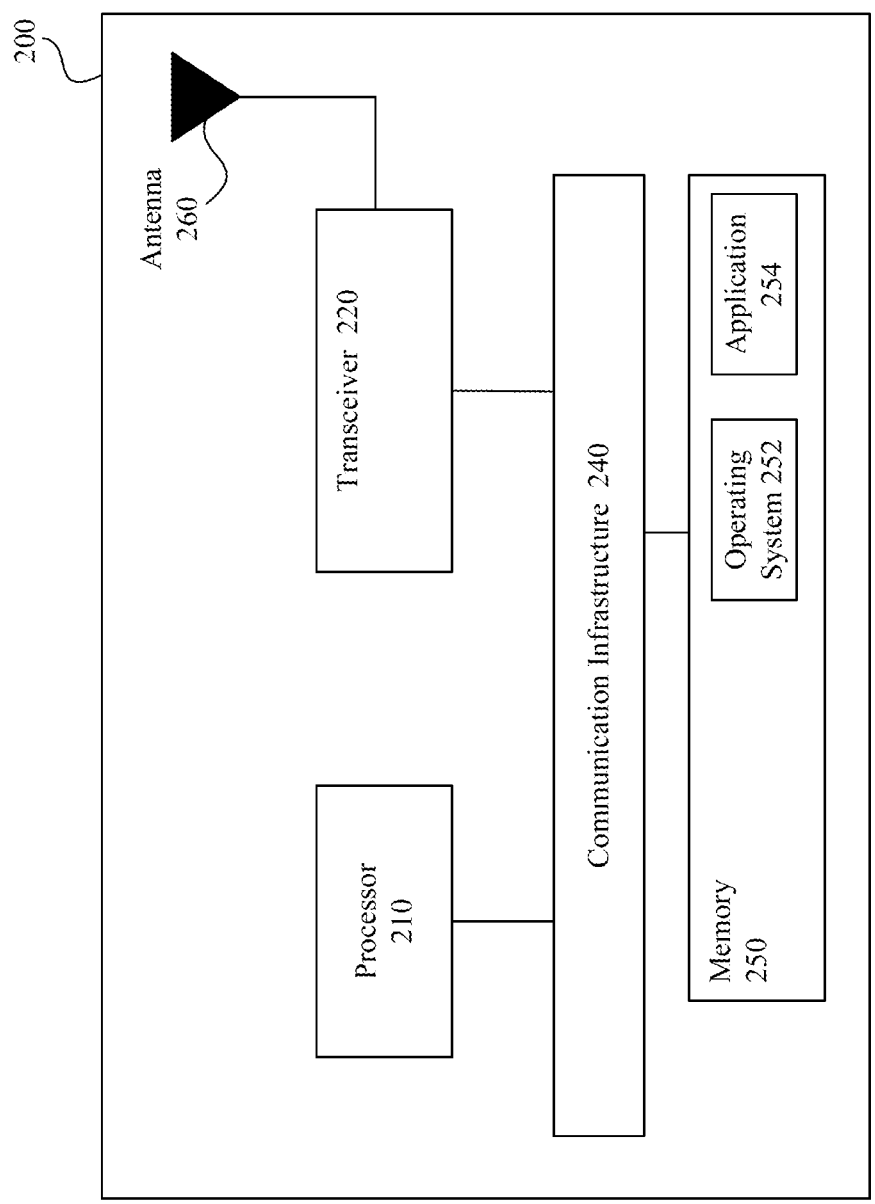
FIG. 2 illustrates a block diagram of an exemplary wireless system of an electronic device, according to some aspects of the disclosure.

FIG. 2 illustrates a block diagram of an example system 200 of an electronic device implementing various aspects of supporting 80 MHz STAs according to some aspects of the disclosure. System 200 may be any of the electronic devices (e.g., AP 11, STA 120) of system 100. The system 200 includes a processor 210, one or more transceivers 220, communication infrastructure 240, memory 250, operating system 252, application 254, and one or more antenna 260. Illustrated systems are provided as exemplary parts of system 200, and system 200 can include other circuit(s) and subsystem(s). Also, although the systems of system 200 are illustrated as separate components, the aspects of this disclosure can include any combination of these, less, or more components.

Memory 250 may include random access memory (RAM) and/or cache, and may include control logic (e.g., computer software) and/or data. Memory 250 may include other storage devices or memory such as, but not limited to, a hard disk drive and/or a removable storage device/unit. According to some examples, operating system 252 can be stored in memory 250. Operating system 252 can manage transfer of data from memory 250 and/or one or more applications 254 to processor 210 and/or one or more transceivers 220. In some examples, operating system 252 maintains one or more network protocol stacks (e.g., Internet protocol stack, cellular protocol stack, and the like) that can include a number of logical layers. At corresponding layers of the protocol stack, operating system 252 includes control mechanism and data structures to perform the functions associated with that layer.

According to some examples, application 254 can be stored in memory 250. Application 254 can include applications (e.g., user applications) used by wireless system 200 and/or a user of wireless system 200. The applications in application 254 can include applications such as, but not limited to, Siri™, FaceTime™, radio streaming, video streaming, remote control, and/or other user applications.

System 200 can also include communication infrastructure 240. Communication infrastructure 240 provides communication between, for example, processor 210, one or more transceivers 220, and memory 250. In some implementations, communication infrastructure 240 may be a bus. Processor 210 together with instructions stored in memory 250 performs operations enabling system 200 to implement high frequency beam switching, as described herein for the system 100, as discussed above.

One or more transceivers 220 transmit and receive beam switching messages. According to some aspects, one or more transceivers 220 may be coupled to antenna 260. Antenna 260 may include one or more antennas that may be the same or different types. One or more transceivers 220 allow system 200 to communicate with other devices that may be wired and/or wireless. In some examples, one or more transceivers 220 can include processors, controllers, radios, sockets, plugs, buffers, and like circuits/devices used for connecting to and communication on networks. According to some examples, one or more transceivers 220 include one or more circuits to connect to and communicate on wired and/or wireless networks.

According to some aspects of this disclosure, one or more transceivers 220 can include a cellular subsystem, a WLAN subsystem, and/or a Bluetooth™ subsystem, each including its own radio transceiver and protocol(s) as will be understood by those skilled arts based on the discussion provided herein. In some implementations, one or more transceivers 220 can include more or fewer systems for communicating with other devices.

In some examples, one or more transceivers 220 can include one or more circuits (including a WLAN transceiver) to enable connection(s) and communication over WLAN networks such as, but not limited to, networks based on standards described in IEEE 802.11.

Additionally, or alternatively, one or more transceivers 220 can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, one or more transceiver 220 can include a Bluetooth™ transceiver.

Additionally, one or more transceivers 220 can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like. For example, one or more transceivers 220 can be configured to operate according to one or more of Rel-15, Rel-16, Rel-17, or later of 3GPP standard.

According to some aspects of this disclosure, processor 210, alone or in combination with computer instructions stored within memory 250, and/or one or more transceiver 220, implements the methods and mechanisms discussed in this disclosure. For example, processor 210, alone or in combination with computer instructions stored within memory 250, and/or one or more transceiver 220, implements mechanisms for supporting high bandwidth stations. According to some aspects of this disclosure, processor 210, alone or in combination with computer instructions stored within memory 250, and/or one or more transceiver 220, can configure 80 MHz STA support.

Figure 3:
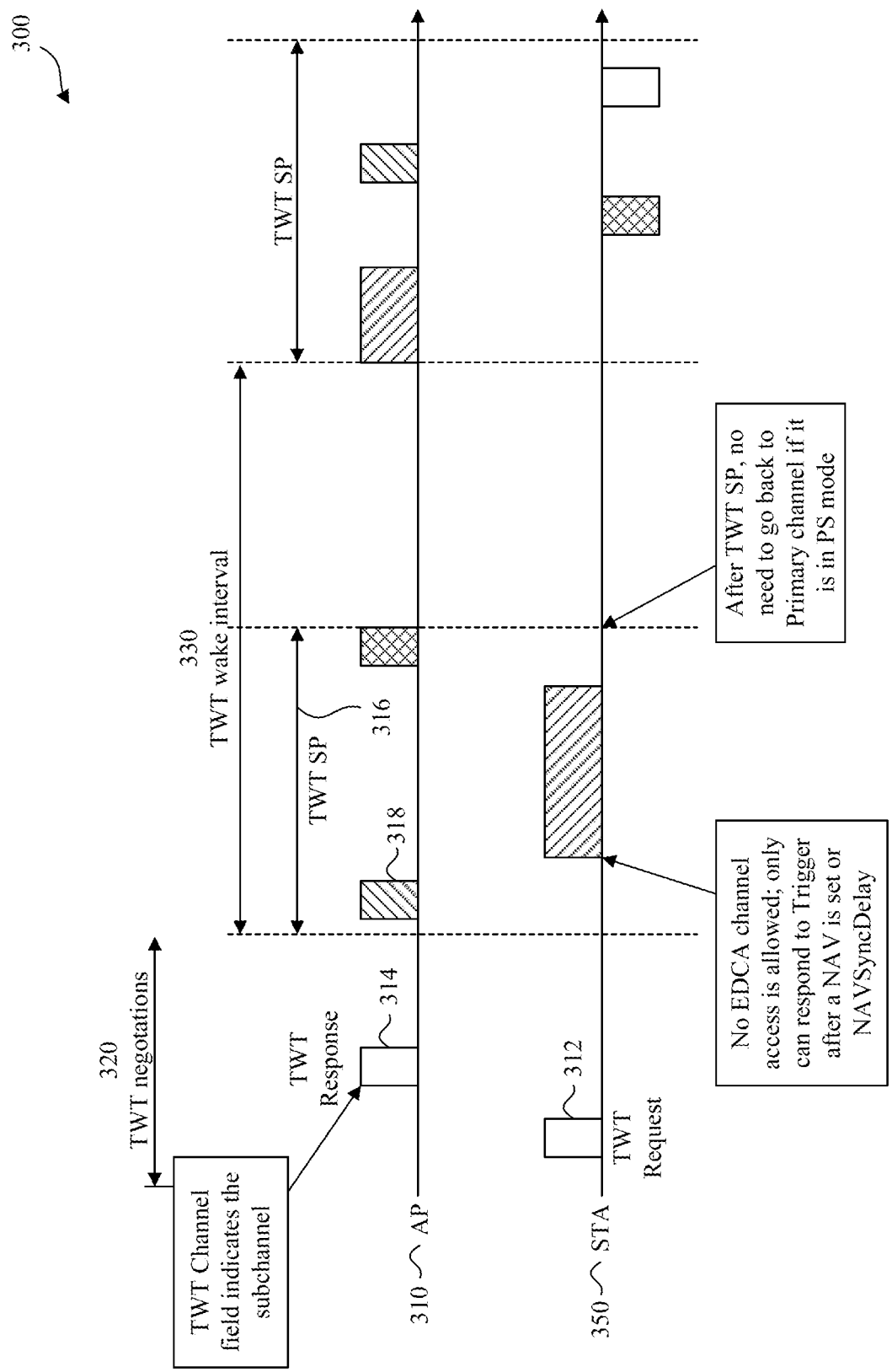
FIG. 3 illustrates a signal diagram of exemplary selective subchannel transmission according to some aspects of the disclosure.

FIG. 3 illustrates a signal diagram of exemplary selective subchannel transmission 300 according to aspects of the disclosure. As shown in FIG. 3, communication is occurring between an access point 310 and a station 350. Initially, the STA 350 and the AP 310 need to set up an individual target wake time (TWT). In the TWT negotiation 320, the TWT channel field is used by the STA to indicate to the AP the channel on which the STA will park. For example, in an 80 MHz BSS, there are four 20 MHz subchannels. Therefore, the STA can tell the AP which of those 4 subchannels (e.g., segments) it will sit on using the TWT channel field.

This occurs by the STA 350 transmitting a TWT request signal 312 that includes the requested frequency segment. The AP 310 transmits a TWT Response 314 in response to the TWT request signal 312 that acknowledges and authorizes the request. In this manner, the AP 310 will know that there is a 20 MHz-only STA parking on that particular frequency segment. In other words, if the STA 350 requests to park on the third 20 MHz segment, and the AP 310 acknowledges this request, then the AP will know that a 20 MHz-only STA is parked on that frequency segment.

Based on the TWT negotiation 320, the AP 310 and the STA 350 establish a TWT service period 316. During this period, the AP 310 can send a trigger frame 318 on the requested frequency segment in order to ask the STA 350 whether there is any uplink traffic using a trigger-based transmission. During this service period 316, the STA 350 is enabled to for uplink transmissions to the AP 310 and the AP 310 can perform downlink transmissions as well. However, outside of this TWT service period 316, if the STA 350 needs to communicate with the AP 310, it must return to the primary channel that the AP 310 is parking on. This is extremely costly in terms of resources, and is undesired.

In an embodiment, the above scheme is adapted to 80 MHz operating STAs. In an example of a 320 MHz bandwidth AP, the AP can intentionally steer the STAs to different 80 MHz frequency segments to balance the load over all of the 80 MHz segments. However, the current negotiation scheme is not usable for this configuration because the current design of the TWT channel field only supports 20 MHz-only STAs, and a maximum BSS channel bandwidth of 160 MHz. Therefore, in order to support a 320 MHz BSS bandwidth an 80 MHz-only operating STAs, new schemes are proposed herein.

In a first embodiment, the 8-bit channel bitmap in the TWT channel field is redefined and given a new meaning for EHT 80 MHz-only operating STAs. However, the TWT negotiation frame includes certain unused fields in 802.11ax. Therefore, in another embodiment, the unused fields in the TWT negotiation frame can be given a definition for defining these messages.

In an embodiment, additional uplink access outside of the SST is provided. In 801.11ax, the STA is limited to use trigger access during the TWT service period. This is particularly limiting in terms of uplink channel access for typical operating STAs supporting various applications. For example, 20 MHz-only operating STAs are typically battery powered and don't have much traffic. On the contrary, 80 MHz operating STAs can have significant amounts of uplink and downlink traffic. As a result, if uplink traffic is limited to being triggered by the AP during a specific service period, this will cause significant limitations on the STA to operate various applications.

Therefore, in the conventional configuration, if the AP wants to allow additional uplink channel access outside of the TWT service period, the STA would need to switch back to the primary channel. This is extremely costly from a resource standpoint. For example, hardware-related channel switching overhead might be costly or small depending on implementation, but probe delay will be large. Specifically, in order to switch back to the primary channel, the STA cannot assume that the channel is idle, so it would have to listen for a certain period to set up its initial state. This time is typically on the order of 5 ms, which is extremely costly.

Any solution should aim to reduce the cost of the channel switch. Further, this should be achievable both for the AP and the 80 MHz-only operating STA. Also, 80 MHz-only operating STAs should be dispersed on different frequency segments so that contention on different 80 MHz segments is low, and so that spectral efficiency can be improved. In order to satisfy these goals, a frequency hopping configuration is proposed.

Therefore, in an embodiment, a primary 80 MHz channel hopping pattern is described. FIG. 4A illustrates an exemplary frequency spectrum diagram 400 according to aspects of the present disclosure. In this embodiment, a 100 ms beacon interval 490 is divided into multiple time windows 430-460, one for each 80 MHz frequency segment. For example, as shown in FIG. 4A, the bandwidth of the AP is broken down into several frequency 80 MHz frequency segments, including a first 80 MHz frequency segment 410a, a second 80 MHz frequency segment 410b, a third 80 MHz frequency segment 410c, and a fourth 80 MHz frequency segment 410d.

In this embodiment, the AP fixes its primary operating channel to the first 80 MHz frequency segment 410a. Meanwhile, each of the STAs will have their respective primary channels on different ones of the 80 MHz frequency segments. For example, a first 80 MHz STA will have its primary channel 430 on the first MHz segment 410a, a second 80 MHz STA will have its primary channel 440 on the second 80 MHz segment 410b, a third 80 MHz STA will have its primary channel 450 on the third 80 MHz segment 410c, and a fourth 80 MHz STA will have its primary channel 460 on the fourth 80 MHz segment 410d. A beacon 420 is sent at both endpoints of the 100 ms beacon interval 490.

Figure 4B:
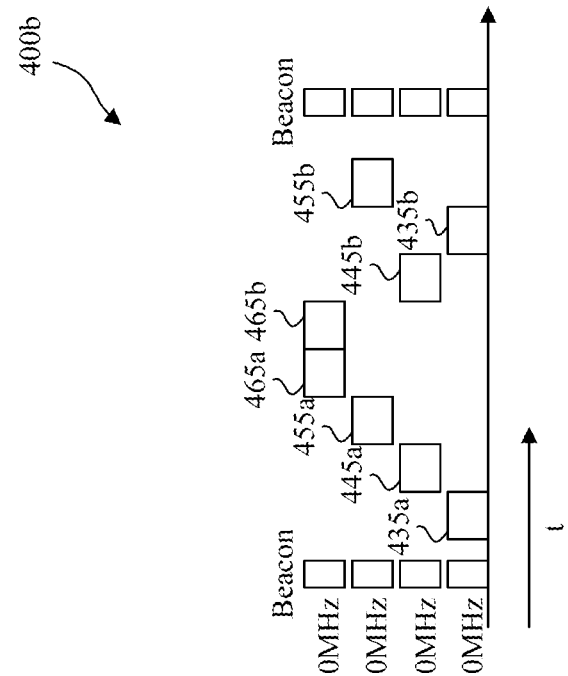
FIG. 4B illustrates an exemplary frequency spectrum diagram according to some aspects of the present disclosure.
Figure 4A:
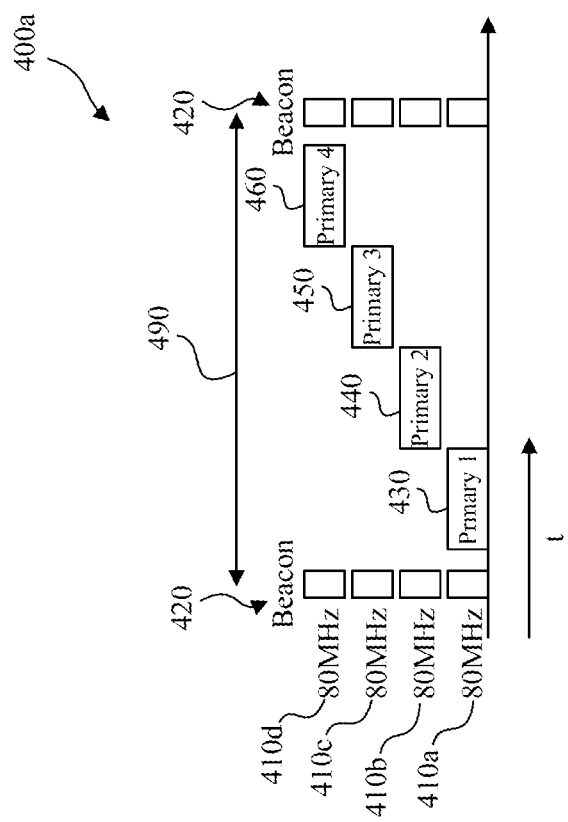
FIG. 4A illustrates an exemplary frequency spectrum diagram according to some aspects of the present disclosure.

In another embodiment, the beacon interval 490 can instead be broken into 8 portions, as shown for example in FIG. 4B. FIG. 4B illustrates an exemplary frequency spectrum diagram 400b according to aspects of the disclosure. As shown in this embodiment, the beacon interval 490 is divided into eight time windows, with each frequency segment 410a-410d having two time windows. For example, STAs parked on the first 80 MHz frequency segment 410a will have designated time windows 435a and 435b, STAs parked on the second 80 MHz frequency segment 410b will have designated time windows 445a and 445b, STAs parked on the third 80 MHz frequency segment 410c will have designated time windows 455a and 455b, and STAs parked on the fourth 80 MHz frequency segment 410d will have designated time windows 465a and 465b.

According to these embodiments, a primary 80 MHz channel hopping pattern is defined. In each of the windows defined by these hopping patterns, the primary 80 MHz channel is different from the viewpoint of the 80 MHz operating STAs. As a result, the corresponding 80 MHz operating STAs can initiate uplink transmission without going back to the primary 80 MHz channel of the AP. These windows are referred to as Designated Time Windows (DTWs). As discussed above, the DTW is a corresponding time window during which the primary channel hops to an 80 MHz channel on which an 80 MHz STA is parked. These primary channels are defined from point of view of the STAs, and are thus referred to as hopped-to-primary 80 MHz channels (e.g., hPrimary 80 MHz channel).

In an embodiment, the AP will also delegate 20 MHz subchannels within each 80 MHz frequency segment. Within these 20 MHz subchannels, one such subchannel will be designated as "primary," and will represent the 80 MHz frequency segment. In an embodiment, the beacon announces which of the 20 MHz subchannels is delegated and can change the primary 20 MHz subchannel based on preferences of the AP or the STA.

In an embodiment, as a result of the 20 MHz primary subchannel being defined, the beacon and other control/management frames are duplicated in all of the 20 MHz subchannels in the Primary Channel Set. Such information may include the timing synchronous function (TSF), Delivery Traffic Indication Message (DTIM), hopping pattern, etc. By selecting a primary 20 MHz channel and duplicating the control information for the STAs, the STAs do not need to go back to the primary channel of the AP in order to receive this information.

To provide an example, one AP services two STAs. The first STA is parked on a first 80 MHz segment, and the second STA is parked on a second 80 MHz segment. Typically, the AP sends control information only on the primary 20 MHz. As a result, the first STA receives the beacon, but the second STA does not unless it performs the costly action of switching. Therefore, in this embodiment, a 20 MHz subchannel is delegated in the second 80 MHz segment as well. The AP duplicates the beacon on that subchannel, which allows the second STA to receive the beacon without switching. Referring back to FIGS. 4A and 4B, this would result in a 20 MHz primary subchannel being designated in each of the 80 MHz frequency segments 410a-410d.

In an embodiment, channel access rules are also defined to facilitate the above configurations. Namely, there are primarily two situations that should be avoided. The first situation occurs when a STA parked on a second 80 MHz segment (e.g., any of the other 80 MHz segments 410b-410d) initiates uplink transmission while the AP is performing downlink transmission its primary 80 MHz segment. In this case, the AP cannot transmit and receive at the same time. The second situation occurs when the AP is performing uplink on its primary 80 MHz segment while some other STA is performing uplink to the AP out of alignment with the AP's uplink. Not only could this cause problems with the AP's reception, but any acknowledgement frames that follow uplink in the second 80 MHz segment may collide with the uplink to the AP in the first 80 MHz segment. This can cause severe problems.

These situations are shown, for example, in FIGS. 5A and 5B. For example, FIG. 5A illustrates a frequency spectrum diagram 500a according to aspects of the disclosure. In this figure, the AP bandwidth separated into four 80 MHz frequency segments 510a-510d. As shown in this first situation, the AP performs downlink 520 during an overlapping time with a STA on the second 80 MHz frequency segment 510b performing uplink 530.

FIG. 5B illustrates a frequency spectrum diagram 500b according to aspects of the disclosure. As shown in this figure, the AP performs uplink reception 540 on its primary 80 MHz segment 510a, in which the AP receives an uplink transmission from a STA parking on the first frequency segment 510a. As shown in FIG. 5B, this uplink period 540 overlaps in time with a STA on the second 80 MHz segment 510b performing uplink 550. The situations of FIGS. 5A and 5B should be avoided in order to ensure proper AP functionality.

Figure 6:
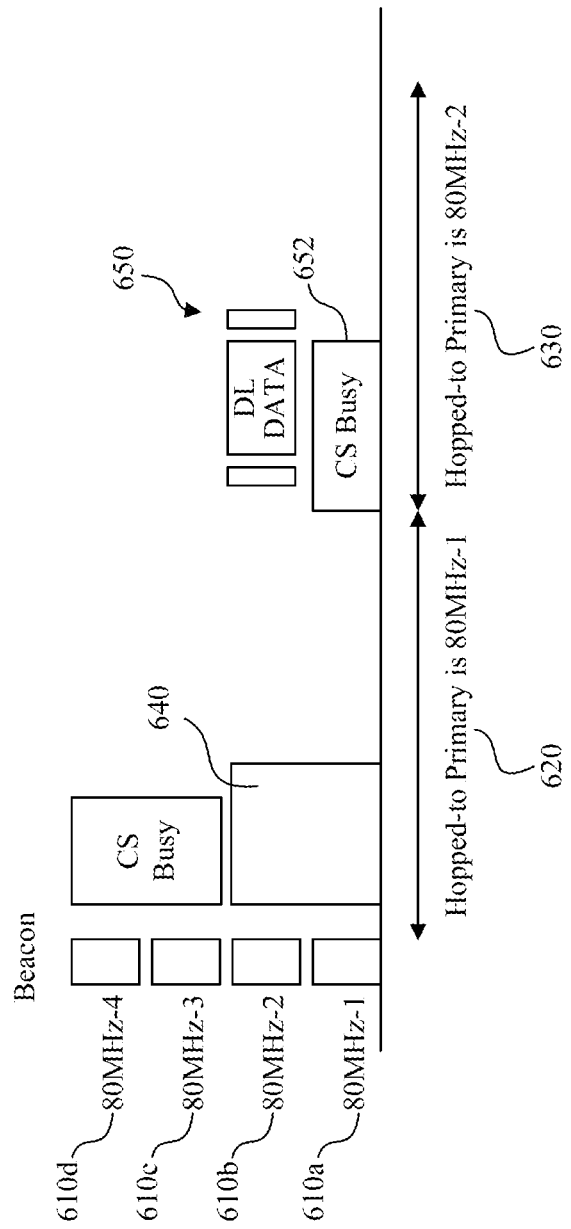
FIG. 6 illustrates an exemplary frequency spectrum diagram according to some aspects of the present disclosure.

Therefore, in an embodiment, in order to avoid the above situations, channel access rules are defined. FIG. 6 illustrates a frequency spectrum diagram 600 according to aspects of the present disclosure. As shown in FIG. 6, the AP bandwidth is broken into four 80 MHz frequency segments 610a-610d. During a first time period 620, from the STAs' viewpoint, the primary channel is located on the hopped-to primary (e.g., hprimary) first frequency segment 610a. During a second time period 630, from the STAs' viewpoint, the primary channel is located on the hprimary second frequency segment 610b.

In an embodiment, the AP will use both the primary 80 MHz channel and the hPrimary 80 MHz channel at a current time slot if they are both idle. This is illustrated in block 640, where the AP has occupied both the first and second 80 MHz segments 610a and 610b. In other words, the AP won't use the hPrimary 80 MHz channel alone if the primary 80 MHz channel is not also idle. This alone will help to prevent the two cases illustrated in FIGS. 5A and 5B from occurring.

Nonetheless, in an embodiment, additional optimizations are included. Specifically, in an embodiment, the STA can trigger the AP's downlink transmission if the primary 80 MHz frequency segment is busy due to an "overlapping BSS" (OBSS) 652. Because the STA can trigger the AP, the AP can perform downlink without any issue. This is illustrated at block 650. As shown, because the STA can perform uplink channel access without restriction, if the STA gets channel access, it can request that the AP send any downlink data it may have for the STA. On the first 80 MHz segment 610a, the channel is not busy because of any transmission from its own BSS, but rather because of an OBSS 652. This can occur due to some other transmission from some other BSS. If the AP is willing to switch its primary 80 MHz channel to the hPrimary 80 MHz channel during a particular DTW, it must notify its associated STAs.

Whereas the above discussion relates to performing downlink communications, embodiments of the present disclosure also address uplink communications. In this embodiment, during the designated time window, the hopped-to 80 MHz channel is the same as the channel on which the STAs park. Thus, STAs on the same channel can initiate a normal uplink transmission through channel contention. In another embodiment, any STA can also choose to switch to the hopped-to primary 80 MHz channel out of its designated time window.

In this embodiment, interaction between the Target Wake Time (TWT) service period and the Designated Time Window (DTW) is also defined. First, the STA can overlap the TWT service period within the DTW. During the overlapping time period of the TWT service period and the DTW, the SST is relaxed to have the Enhanced Distribution Channel Access (EDCA) uplink channel access and remove restriction on prohibiting EDCA channel access. Meanwhile, if the TWT service period does not overlap with the DTW, the STA must rely on triggered uplink channel access.

Although the above discussions relate primarily to 80 MHz-only operating STAs, 160 MHz and 320 MHz operating STAs can also be supported. For these 802.11be STAs, it is possible to have simultaneous uplink from an 802.11be or 802.11ax 160 MHz legacy STA parking on the 80 MHz channel. In this situation, it must be ensures that the problems described above do not occur. In other words, a non-80 MHz operating STA may only use the primary 80 MHz frequency segment for channel access if the STA does not switch accordingly. In this case, it is possible to have simultaneous uplink from an 802.11be STA or a legacy STA parking at the primary 80 MHz channel, and an 80 MHz operating STA using an hPrimary 80 MHz segment. Consequently, for 802.11be STAs, multiple embodiments are described below.

Therefore, in an embodiment, an all or nothing approach can be taken. In this embodiment, the non-80 MHz operating STA either uses the entire bandwidth that it can get or nothing at all (e.g., dynamic bandwidth prohibited). For example, for a STA that supports 160 MHz, the STA must make sure that all the supporting frequency segments it can support are idle before it transmits.

In another embodiment, the transmission must include the primary 80 MHz and hPrimary 80 MHz channel for a current time slot. Referring back to FIG. 6, an example of this embodiment is illustrated in block 640. In this embodiment, if an 802.11 STA is parking on the AP's primary channel and is trying to access the channel doing for uplink transmission, the STA must verify that both the primary 80 MHz from the AP side frequency segment 1 610a and the 80 MHz frequency segment 2 610b are idle in order for the STA to transmit.

In another embodiment, a non-80 MHz operating STA can hop its primary channel according to a Primary Channel Hopping Pattern with some relaxed conditions on how to initiate its EDCA when its primary channel hops. In this embodiment, the relaxed condition is used to compensate for the cost of the STA switching its channel. In various embodiments, these relaxed conditions may include eliminating the time necessary to establish the EDCA function on the new channel. Additionally, in this embodiment, the STA can use the full bandwidth that it supports.

Unlike the 802.11be STAs, discussed above, it is more difficult to require that legacy 80 MHz or 160 MHz STAs do not initiate uplink transmissions during prohibited time periods. Therefore, in an embodiment, the AP forces the legacy STAs to switch their primary channels. However, this solution is not only difficult to implement, but also costly in terms of resources. Therefore, in another embodiment, the AP can force channel access to certain designated time windows using new signaling, which is illustrated in FIG. 7.

Figure 7:
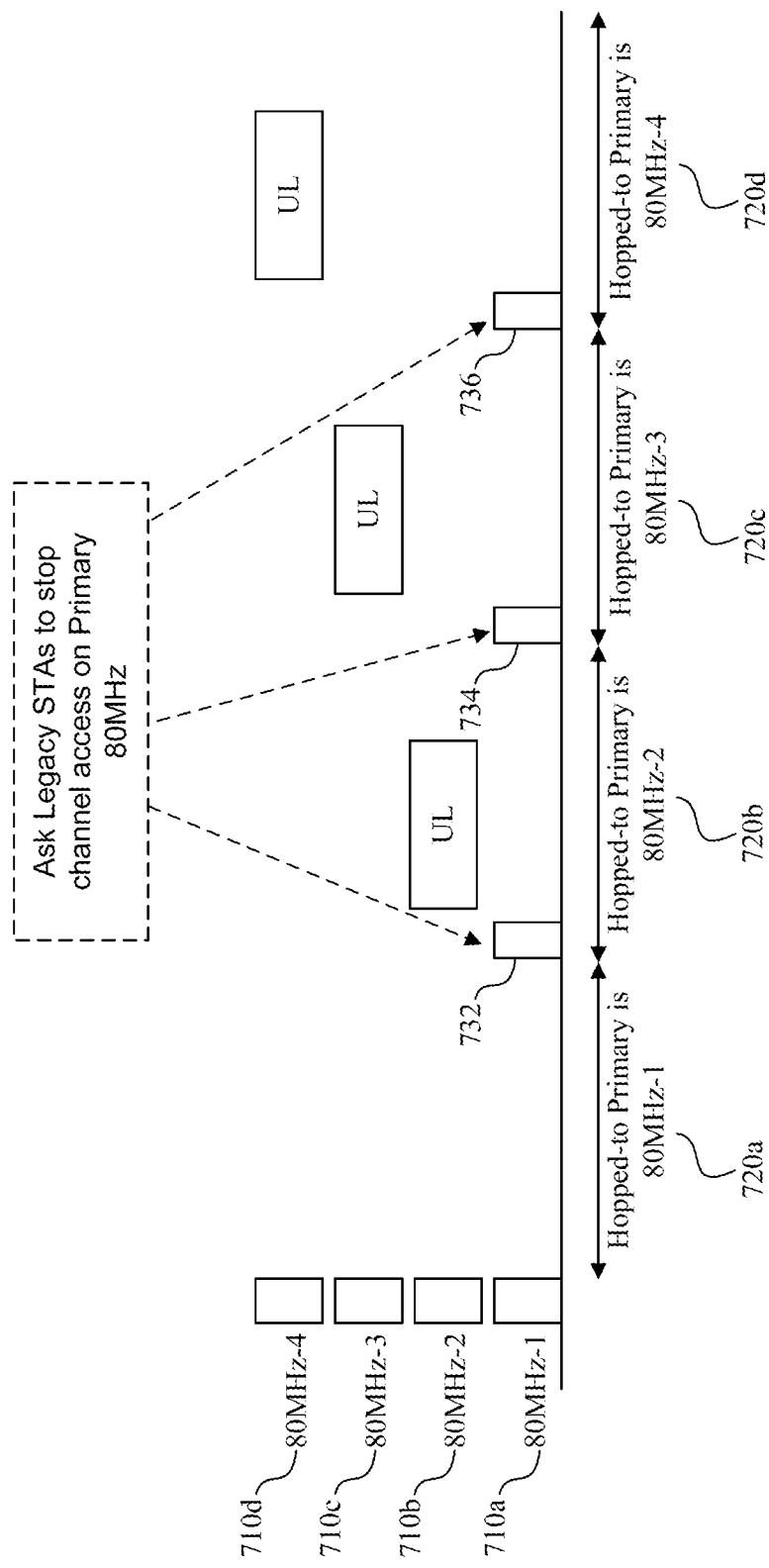
FIG. 7 illustrates an exemplary frequency spectrum diagram of an exemplary signal timing according to some aspects of the disclosure.

FIG. 7 illustrates a frequency spectrum diagram of an exemplary signal timing 700 according to aspects of the disclosure. As shown in FIG. 7, a 320 MHz bandwidth is separated into four equal 80 MHz frequency segments 710a-710d. Along a horizontal time access, the hopped-to Primary channel cycles from the first 80 MHz frequency segment during time period 720a, the second 80 MHz frequency segment during time period 720b, the third 80 MHz frequency segment during time period 720c, and the fourth 80 MHz frequency segment during time period 720d.

In this embodiment, as shown in FIG. 7, the AP transmits a quiet time setup message 732 at the beginning of time period 720b, telling all of the AP's associated 802.11ax STAs to refrain from initiating any UL transmission during the time period 720b. This message can be repeated during other time periods that the AP requires quiet. Namely, the AP may transmit a quiet time setup message 734 at the beginning of time period 720c, and/or quiet time setup message 736 during time period 720d. In an alternative embodiment, rather than the AP employing setup quiet time messages, the AP instead uses a control or management frame, such as CTS2Self or Opportunistic Power Save frame in order to blindly quiet all associated STAs on the primary channel for a certain period. In this manner, the AP causes legacy STAs to stop channel access during designated time windows in which the primary channel should be silent. This allows 80 MHz STAs parked on those frequency segments 710a-710d to freely transmit without interference.

In embodiments, AP-side optimizations for uplink channel access are disclosed. In current 802.11ax STAs, the trigger frame is duplicated to send the same information on each 20 MHz frequency sub-segment. In this manner, all trigger frames have the same content. However, for the 320 MHz bandwidth (or the 160 MHz bandwidth) APs that are the subject of this disclosure, if the AP wants to trigger the 80 MHz only STA on a different frequency signal, it's better to have different content on the different trigger frames.

Notably, the AP knows which channels the 80 MHz-only operating STAs are parked on. Therefore, in this embodiment, the AP generates each trigger frame to have different Trigger Frame User Information (Info) List for each 80 MHz frequency segment. In other words, the same Trigger Frame User Info List is only duplicated in its 80 MHz frequency segment. However, the Trigger Frame User Info List differs between different 80 MHz frequency segment because different STAs are parked on different frequency segments. Meanwhile, the Trigger Frame Common Info remains constant between all 80 MHz frequency segments. Herein, the common Info can be referred to as common data and the different info can be referred to a different data.

Using the updated trigger frame scheme described above, significant efficiency can be realized. Table 1, below, illustrates a percentage of airtime that is consumed by the triggering mechanism per number of users. As can be seen below, with successive users, the trigger frame TXTIME (e.g., the amount of time the trigger frame needs over the air) and the M-BA TXTIME (e.g., the amount of time required for the acknowledge frame after the uplink trigger access), both increase. Thus, when the users are equally distributed on different frequency segments, the percentage of the airtime required to perform the triggering significantly increases as the number of users increases. Meanwhile, if the trigger frame is designed with different content for different 80 MHz frequency segments, this airtime percentage can be significantly reduced.

| #Users | Trigger Frame TXTIME (μs) | M-BA TXTIME (μs) | Airtime Percentage |
| --- | --- | --- | --- |
| 4 | 108 | 116 | 5.6% |
| 8 | 140 | 180 | 8% |
| 16 | 204 | 308 | 12.8% |
| 32 | 332 | 564 | 22.4% |
| 64 | 488 | 1076 | 41.6% |
| 128 | 1100 | 2100 | 80% |

To further optimize this trigger frame, in an embodiment, the Trigger Frame User Info List and Padding should result in a trigger frame that is the same length for each of the different 80 MHz frequency segments. In an additional embodiment, the trigger frame is sent on channels that are members of the Primary Channel Set.

Figure 8:
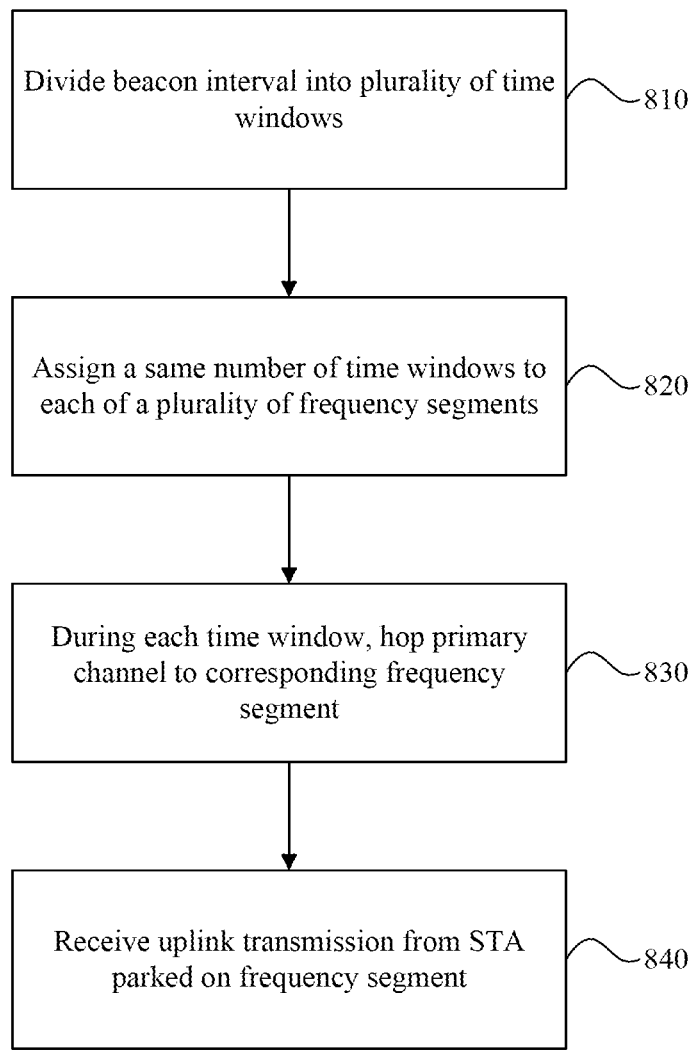
FIG. 8 illustrates a block diagram of an exemplary method 800 for supporting a high-bandwidth station according to some aspects of the disclosure.

FIG. 8 illustrates a flowchart diagram of an exemplary method 800 for supporting a high-bandwidth station according to aspects of the disclosure. Referring to FIG. 8, a beacon interval (e.g., the time duration between beacon broadcasts) is divided into a plurality of time windows 810, as is shown in FIGS. 4A-4B. These time windows are then assigned to each of a plurality of frequency segments 820. In an embodiment, these time windows have equal duration, and an equal number of time windows are assigned to each frequency segment of the bandwidth.

During each time window, the access point hops the primary channel to one of the frequency segments to which the present time window is assigned 830. As a result of this channel hopping, stations parked on the frequency segment associated with the current time window transmit uplink communications to the access point 840.

Figure 9:
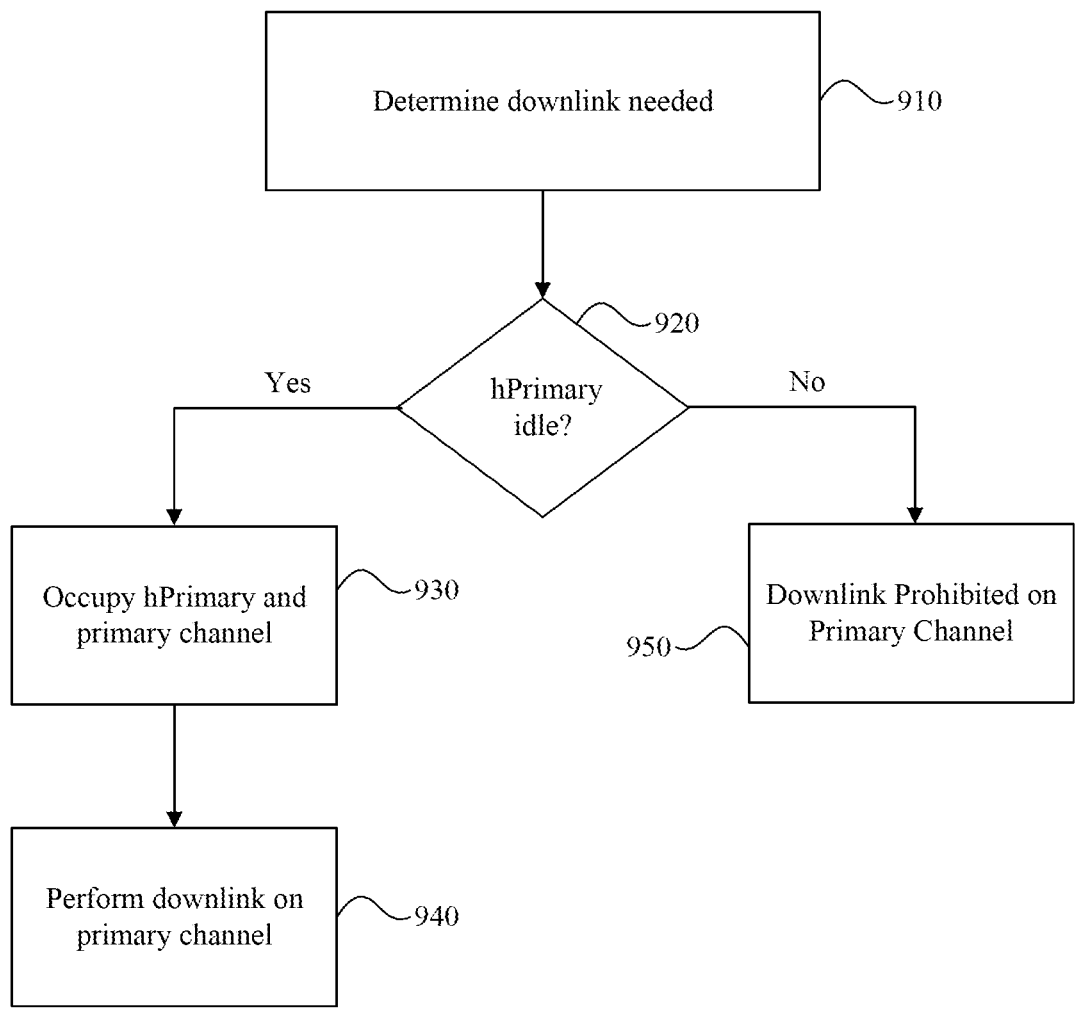
FIG. 9 illustrates a block diagram of an exemplary method 900 for performing uplink by an access point according to some aspects of the disclosure.

FIG. 9 illustrates a flowchart diagram of an exemplary method 900 for performing downlink by an access point according to aspects of the disclosure. As shown in FIG. 9, the access point first identifies that it requires to perform downlink transmission 910. As discussed above, the access point will be configured to hop the primary channel for the STAs to different frequency segments at different times. Therefore, the access point next checks whether the current hopped-to primary channel is idle 920. If it is, then the access point occupies both the current hopped-to primary channel and its primary channel 930, so that the access point is able to perform downlink communications on the primary channel 940. If both channels are not available, the access point is not able to perform downlink on the primary channel 950.

Figure 10:
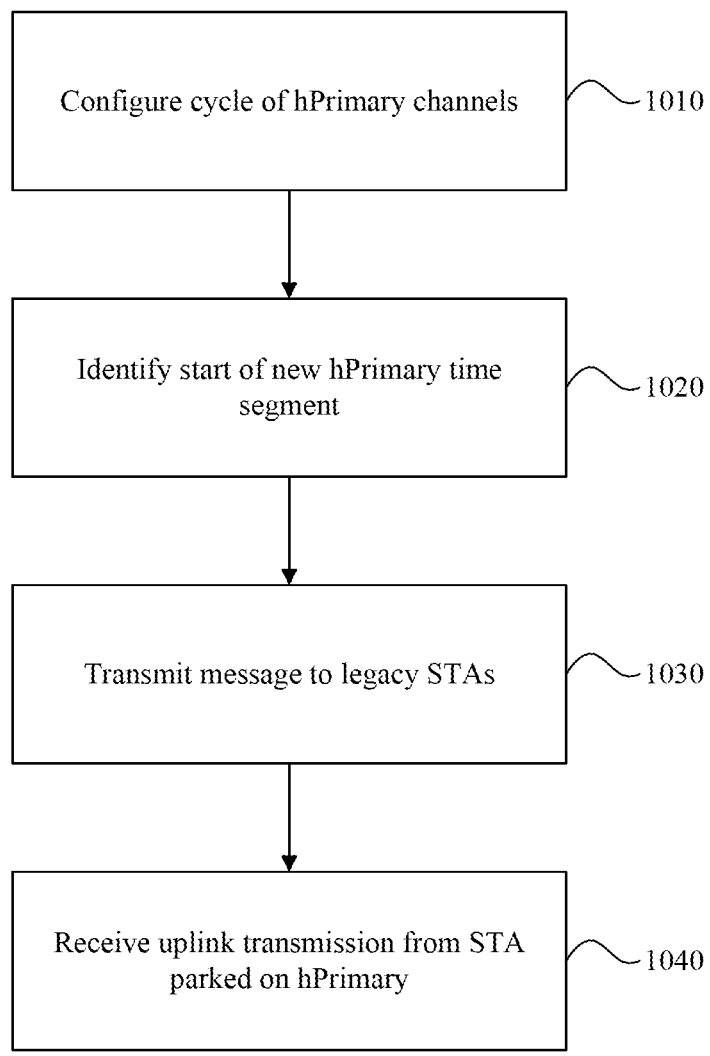
FIG. 10 illustrates a block diagram of an exemplary method 1000 permitting uplink communication from a legacy station according to some aspects of the disclosure.

FIG. 10 illustrates a flowchart diagram of an exemplary method 1000 for permitting uplink communication from a legacy station according to aspects of the disclosure. As shown in FIG. 10, the access point first configures a cycle of hopped-to primary channels 1010, such as discussed above with respect to FIG. 7. Then, during operation, the access point identifies the beginning of a new time window (e.g., the start of a new hopped-to-primary channel) 1020. At this time, the access point generates and transmits a message to legacy STAs 1030. In an embodiment, the message requests that the legacy STAs stop channel access on the primary 80 MHz channel. Thereafter, the access point receives an uplink transmission from a STA parked on the current hopped-to primary channel 1040.

Figure 11:
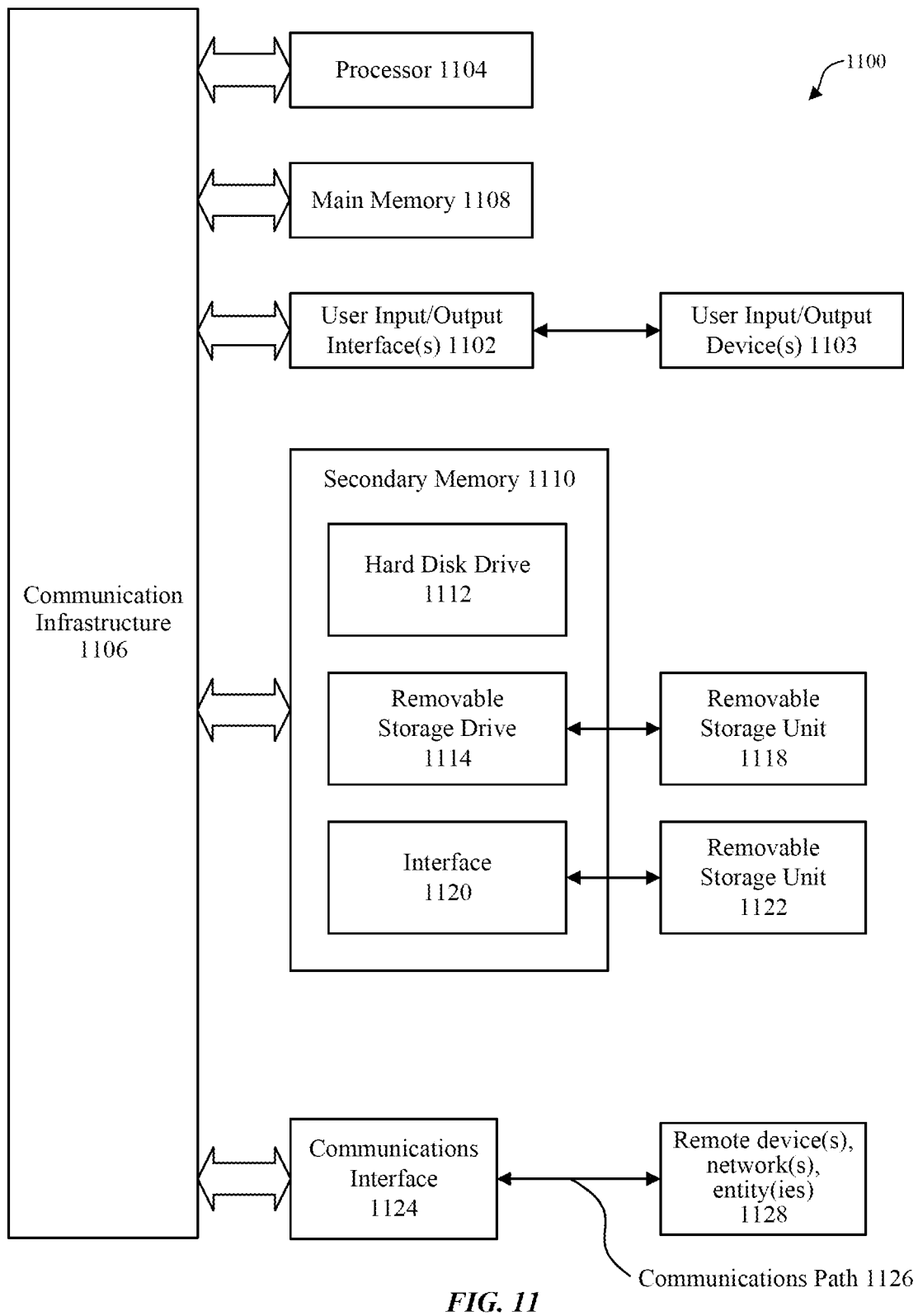
FIG. 11 illustrates a block representation of an exemplary generic computer system capable of implementing some aspects of the present disclosure.

Various aspects can be implemented, for example, using one or more computer systems, such as computer system 1100 shown in FIG. 11. Computer system 1100 can be any well-known computer capable of performing the functions described herein such as those performed by device 200 of FIG. 2, and including the functional descriptions in FIGS. 8-10. Computer system 1100 includes one or more processors (also called central processing units, or CPUs), such as a processor 1104. Processor 1104 is connected to a communication infrastructure 1106 (e.g., a bus.) Computer system 1100 also includes user input/output device(s) 1103, such as monitors, keyboards, pointing devices, etc., that communicate with communication infrastructure 1106 through user input/output interface(s) 1102. Computer system 1100 also includes a main or primary memory 1108, such as random access memory (RAM). Main memory 1108 may include one or more levels of cache. Main memory 1108 has stored therein control logic (e.g., computer software) and/or data.

Computer system 1100 may also include one or more secondary storage devices or memory 1110. Secondary memory 1110 may include, for example, a hard disk drive 1112 and/or a removable storage device or drive 1114. Removable storage drive 1114 may be a floppy disk drive, a magnetic tape drive, a compact disk drive, an optical storage device, tape backup device, and/or any other storage device/drive.

Removable storage drive 1114 may interact with a removable storage unit 1118. Removable storage unit 1118 includes a computer usable or readable storage device having stored thereon computer software (control logic) and/or data. Removable storage unit 1118 may be a floppy disk, magnetic tape, compact disk, DVD, optical storage disk, and/any other computer data storage device. Removable storage drive 1114 reads from and/or writes to removable storage unit 1118 in a well-known manner.

According to some aspects, secondary memory 1110 may include other means, instrumentalities or other approaches for allowing computer programs and/or other instructions and/or data to be accessed by computer system 1100. Such means, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1100 may further include a communication or network interface 1124. Communication interface 1124 enables computer system 1100 to communicate and interact with any combination of remote devices, remote networks, remote entities, etc. (individually and collectively referenced by reference number 1128). For example, communication interface 1124 may allow computer system 1100 to communicate with remote devices 1128 over communications path 1126, which may be wired and/or wireless, and which may include any combination of LANs, WANs, the Internet, etc. Control logic and/or data may be transmitted to and from computer system 1100 via communication path 1126.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 1100, main memory 1108, secondary memory 1110 and removable storage units 1118 and 1122, as well as tangible articles of manufacture embodying any combination of the foregoing. Such control logic, when executed by one or more data processing devices (such as computer system 1100), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 11. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary aspects of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific aspects will so fully reveal the general nature of the disclosure that others can, by applying knowledge within the skill of the art, readily modify and/or adapt for various applications such specific aspects, without undue experimentation, without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary aspects, but should be defined only in accordance with the following claims and their equivalents.

As described above, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. An access point, comprising:
   a transceiver configured to transmit and receive wireless signals in communication with a plurality of stations distributed over a predefined bandwidth; and
   one or more processors configured to:
   define a plurality of contiguous frequency segments within the predefined bandwidth, each frequency segment configured to support parking of a subset of the plurality of stations;
   define a hopping pattern between the contiguous frequency segments that includes a plurality of contiguous time windows within a beacon interval respectively corresponding to the plurality of contiguous frequency segments;
   transmit, using the transceiver, a message to the plurality of stations indicating the plurality of contiguous time windows; and
   receive signals from a corresponding subset of the plurality of stations according to the plurality of contiguous time windows and their respective corresponding contiguous frequency segments.

2. The access point of claim 1, wherein the contiguous frequency segments each have a same bandwidth.

3. The access point of claim 1, wherein the predefined bandwidth is at least 160MHz and a bandwidth of the contiguous frequency segments is 80 MHz.

4. The access point of claim 1, wherein the plurality of contiguous time windows includes a same number of contiguous time windows associated with each of the plurality of contiguous frequency segments.

5. The access point of claim 1, wherein the plurality of contiguous time windows comprises four contiguous time windows, each having a duration of one fourth of the beacon interval.

6. The access point of claim 1, wherein the plurality of contiguous time windows comprises eight contiguous time windows, each having a duration of one eight of the beacon interval.

7. The access point of claim 1, wherein the one or more processors causes a primary frequency to cycle from a first contiguous frequency segment to a last contiguous frequency segment through successive contiguous time windows of the plurality of contiguous time windows.

8. The access point of claim 1, wherein the one or more processors are further configured to delegate a subchannel within each contiguous frequency segment, the subchannel comprising a subset of a bandwidth of each contiguous frequency segment.

9. The access point of claim 8, wherein the one or more processors are further configured to transmit a beacon on each of the delegated subchannels.

10. A method for supporting a plurality of high-bandwidth stations in a wireless communication environment, comprising:
   defining a plurality of contiguous frequency segments within a predefined bandwidth, each contiguous frequency segment configured to support parking of a subset of the plurality of stations;
   defining a hopping pattern between the contiguous frequency segments that includes a plurality of contiguous time windows with a beacon interval respectively corresponding to the plurality of contiguous frequency segments;

transmitting a message to the plurality of stations, the message indicating the plurality of contiguous time windows;

receiving signals from a corresponding subset of the plurality of stations according to the plurality of contiguous time windows; and receiving messages from the plurality of stations on a primary communication frequency.

11. The method of claim 10, wherein the predefined bandwidth is 320MHz, and each contiguous frequency segment includes a bandwidth of 80MHz.

12. The method of claim 10, wherein each contiguous time window has a same duration.

13. The method of claim 10, further comprising:
receiving a channel access request from a legacy station;
determining whether a primary channel of the legacy station and a hopped-to primary channel are idle; and
authorizing channel access based on the determining.

14. The method of claim 10, further comprising:
generating a trigger frame associated with each of the plurality of contiguous frequency segments for transmission to the plurality of stations, a first portion of the trigger frames including common data and a second portion of the trigger frames including different data depending on the frequency segment for which the trigger frames are generated.

15. The method of claim 14, wherein the first portion includes Trigger Frame Common Information, and wherein the second portion includes a Trigger Frame User Information List.

16. A non-transitory computer-readable storage medium having instructions stored thereon that, when executed by one or more processors, cause the one or more processors to perform operations, the operations comprising:
defining a plurality of contiguous frequency segments within a predefined bandwidth, each frequency segment configured to support parking of a subset of a plurality of stations;
defining a hopping pattern between the contiguous frequency segments that includes a plurality of contiguous time windows with a beacon interval respectively corresponding to the plurality of contiguous frequency segments;
transmitting a message to the plurality of stations, the message indicating the plurality of contiguous time windows;
receiving signals from a corresponding subset of the plurality of stations according to the plurality of contiguous time windows; and
receiving messages from the plurality of stations on a primary communication frequency.

17. The non-transitory computer-readable storage medium of claim 16, wherein the predefined bandwidth is 320MHz, and each frequency segment includes a bandwidth of 80MHz.

18. The non-transitory computer-readable storage medium of claim 16, wherein each contiguous time window has a same duration.

19. The non-transitory computer-readable storage medium of claim 16, the operations further comprising:
receiving a channel access request from a legacy station;
determining whether a primary channel of the legacy station and a hopped-to primary channel are idle; and
authorizing channel access based on the determining.

20. The non-transitory computer-readable storage medium of claim 16, the operations further comprising:
generating a trigger frame associated with each of the plurality of contiguous frequency segments for transmission to the plurality of stations, a first portion of the trigger frames including common data and a second portion of the trigger frames including different data depending on the frequency segment for which the trigger frames are generated.

* * * * *